United States Patent
Shin

(10) Patent No.: US 11,247,881 B2
(45) Date of Patent: Feb. 15, 2022

(54) LIFTING APPARATUS FOR HIGHLY-MOUNTED DEVICE AND CONTROL METHOD THEREOF

(71) Applicant: REEL TECH CO., LTD., Jeollanam-do (KR)

(72) Inventor: Jeong Hoon Shin, Jeollanam-do (KR)

(73) Assignee: REEL TECH CO., LTD., Suncheon Si (KR)

( * ) Notice: Subject to any disclaimer, the term of this patent is extended or adjusted under 35 U.S.C. 154(b) by 102 days.

(21) Appl. No.: 16/759,576

(22) PCT Filed: Oct. 26, 2018

(86) PCT No.: PCT/KR2018/012798
§ 371 (c)(1),
(2) Date: Apr. 27, 2020

(87) PCT Pub. No.: WO2019/083315
PCT Pub. Date: May 2, 2019

(65) Prior Publication Data
US 2020/0299114 A1    Sep. 24, 2020

(30) Foreign Application Priority Data

Oct. 27, 2017  (KR) .......................... 10-2017-0141517
Aug. 3, 2018   (KR) .......................... 10-2018-0090970

(51) Int. Cl.
*B66D 1/48* (2006.01)
*B66D 1/36* (2006.01)
(Continued)

(52) U.S. Cl.
CPC .............. *B66D 1/48* (2013.01); *B66D 1/12* (2013.01); *B66D 1/34* (2013.01); *B66D 1/36* (2013.01);
(Continued)

(58) Field of Classification Search
CPC ... B66D 1/12; B66D 1/34; B66D 1/36; B66D 1/46; B66D 1/48; B66D 1/54; B66D 1/56;
(Continued)

(56) References Cited

U.S. PATENT DOCUMENTS 4,794,662 A * 1/1989 Parcher .................. B66D 1/46
                                                        15/249.1
5,405,027 A * 4/1995 Plass ...................... B66C 13/50
                                                        212/281

(Continued)

FOREIGN PATENT DOCUMENTS

CN   202322245 U   7/2012
CN   202449775 U   9/2012
(Continued)

OTHER PUBLICATIONS

International Search Report and Written Opinion, filed in International Application No. PCT/KR2018012798, dated Feb. 19, 2019, pp. 1-2.

*Primary Examiner* — Michael E Gallion
(74) *Attorney, Agent, or Firm* — Wolter Van Dyke Davis, PLLC; Eugene J. Molinelli

(57) ABSTRACT

Disclosed is a control method of a lifting apparatus for a highly-mounted device. The control method includes (a) outputting a descending signal in a state where the main body and the lifting body are coupled; (b) determining whether the lifting body is normally released downward from the main body according to the descending signal; and (c) stopping the driving motor or executing the step (a) again when the lifting body is not normally released downward, wherein in the step (b), it is determined whether the lifting body is normally released downward from the main body by checking whether a weight of the lifting body is applied to the wire rope.

13 Claims, 8 Drawing Sheets

(51) Int. Cl.
    *F21V 21/38*     (2006.01)
    *B66D 1/34*     (2006.01)
    *B66D 1/56*     (2006.01)
    *B66D 1/60*     (2006.01)
    *B66D 1/12*     (2006.01)
    *B66D 1/54*     (2006.01)
    *A62C 99/00*     (2010.01)
    *H04N 5/225*     (2006.01)

(52) U.S. Cl.
    CPC ................ *B66D 1/54* (2013.01); *B66D 1/56* (2013.01); *B66D 1/60* (2013.01); *A62C 99/009* (2013.01); *B66D 2700/025* (2013.01); *F21V 21/38* (2013.01); *H04N 5/2253* (2013.01)

(58) Field of Classification Search
    CPC ........ B66D 1/60; F21V 21/38; H04N 5/2253; A62C 99/009
    See application file for complete search history.

(56) References Cited

U.S. PATENT DOCUMENTS

| | | | | |
|---|---|---|---|---|
| 7,063,306 B2* | 6/2006 | Sanders | ................ | B66D 1/485 254/361 |
| 7,153,001 B2* | 12/2006 | Kim | ........................ | F21V 21/38 362/291 |
| 8,215,618 B2* | 7/2012 | Kochan | ................... | B66D 1/14 254/266 |
| 9,758,340 B1* | 9/2017 | Reese | ................... | B65H 54/026 |
| 10,502,362 B2* | 12/2019 | Shin | ..................... | H04N 5/2253 |
| 2004/0012969 A1* | 1/2004 | Sin | ........................... | F21V 21/36 362/384 |
| 2010/0051767 A1* | 3/2010 | Erel | ........................ | B66C 23/02 248/205.1 |
| 2012/0168397 A1* | 7/2012 | Lim | ...................... | B66C 13/063 212/273 |
| 2013/0038263 A1* | 2/2013 | Faucher | ............... | A61G 7/1065 318/434 |
| 2017/0009937 A1* | 1/2017 | Shin | ..................... | H04N 5/2253 |
| 2017/0015535 A1* | 1/2017 | Haddix, II | ........... | B66F 11/042 |

FOREIGN PATENT DOCUMENTS

| | | |
|---|---|---|
| CN | 106335848 A | 1/2017 |
| CN | 20615665 U | 5/2017 |
| CN | 206156653 U | 5/2017 |
| JP | 8-192995 A | 7/1996 |
| JP | H1059700 A | 3/1998 |
| JP | 2000-016766 A | 1/2000 |
| JP | 2009-0202976 A | 9/2009 |
| JP | 2009202976 A | 9/2009 |
| JP | 5842135 B2 | 1/2016 |
| KR | 1020060002714 | 1/2006 |
| KR | 101056847 B | 1/2009 |
| KR | 10-2010-0024884 A | 3/2010 |
| KR | 10-1184989 B1 | 10/2012 |
| KR | 101488412 B1 | 7/2014 |

* cited by examiner

A

B

LIFTING APPARATUS FOR HIGHLY-MOUNTED DEVICE AND CONTROL METHOD THEREOF

TECHNICAL FIELD

The present application claims priority to Korean Patent Application No. 10-2017-0141517 filed on Oct. 27, 2017 in the Republic of Korea, the disclosures of which are incorporated herein by reference.

The present disclosure relates to a lifting apparatus for a highly-mounted device and a control method thereof, and more particularly, to a lifting apparatus for a highly-mounted device, which has a structure for moving the highly-mounted device upward or downward by winding or releasing a wire rope around a drum, and a control method thereof.

BACKGROUND ART

In general, a so-called highly-mounted light is installed at a hotel lobby, a factory ceiling, a gymnasium and a streetlight. The highly-mounted light is mainly equipped with a sodium light bulb or a mercury light bulb, and the life of the highly-mounted light is limited to 5000 to 6000 hours and should be changed periodically. In addition, the highly-mounted lights installed in service companies such as hotel lobbies and wedding halls need to replace light bulbs along with periodic cleaning for keeping exterior and exhibition effects.

Since the highly-mounted light is located at a height of 7 to 10 m in the case of a streetlight, an aerial crane or a ladder truck equipped with a basket should be used for cleaning or replacing the light bulb of the highly-mounted light. In addition, in a wedding hall, a hotel lobby, or the like, which has a relatively low height, a ladder is installed to clean or replace the light bulb, but in this case, there is a risk of accidents caused by falling. Moreover, at least three persons should be working in a group to carry out the cleaning or replacing work. Further, since large work facilities such as a crane and a ladder truck are used in the work place for the highly-mounted light, the work time is delayed and the work space is increased. Thus, when repairing or replacing highly-mounted light, a factory line should be stopped or the gym gymnasium cannot be used for a long time, so the repairing or replacing work should be finished quickly. In particular, when the streetlight is required or replaced, a cargo crane occupies one lane, thereby causing problems such as traffic jams.

As an alternative, a working method using a highly-mounted light, in which the highly-mounted light is lowered to the ground where a worker is located and then raised and fixed to the ceiling again, without working at a high spot where the highly-mounted light is located, and a device for the working method have been consistently developed.

As a device for lowering the highly-mounted light attached to the ceiling to the ground, there are proposed a manual lifting device for a highly-mounted light, in which a wire rope is fixed to the light and the wire rope is wound on a pulley fixed to the ground via the ceiling so that a user lifts the highly-mounted light by manipulating a handle bar connected to the pulley, and an automatic lifting device for a highly-mounted light, which uses a driving motor instead of the handle bar.

In general, the automatic lifting device for a highly-mounted light includes a socket (main body) fixed at a given height on the ceiling, a light fitting (lifting body) inserted into the socket to make a point contact with the socket and having a lower side to which a light bulb is mounted, a wire rope having one end fixed on an upper side of the light fitting and the other end provided on a drum installed at a predetermined location of the socket in a state of being wound by a predetermined length, and a driving motor configured to automatically wind unwind the wire rope on the drum according to the selection of a user to move the light fitting upward or downward.

The technique related to the configuration of unwinding and winding the wire rope in the automatic lifting device for a highly-mounted light is disclosed, for example, in Korean Patent No. 10-1056847. The highly-mounted light lifting device disclosed in Korea Patent No. 10-1056847 includes a sensing plate, which is pushed to the outer direction of a drum as the layer of wire rope wound around the drum increases, and a driving switch pressed by the contact of the sensing plate when the sensing plate is pushed to a set position to stop the operation of a drive means for rotating the drum, wherein the drum is arranged to be placed in a standing state in the main body.

However, the conventional automatic lifting device for a highly-mounted light may perform a winding or unwinding operation without accurately recognizing the coupling state between a main body and a lifting body, which may cause a wire rope to be wound or unwound in a state where the main body and the lifting body is not normally coupled or separated. This may cause a safety accident, so measures are required thereto.

DISCLOSURE

Technical Problem

The present disclosure is designed to solve the problems of the related art, and therefore the present disclosure is directed to providing a lifting apparatus for a highly-mounted device, which has a structure capable of preventing a safety accident by lifting control in consideration of a coupling or separating error between a main body and a lifting body, and a control method thereof.

Technical Solution

In one aspect of the present disclosure, there is provided a control method of a lifting apparatus for a highly-mounted device, the lifting apparatus including a main body at which a hollow drum for winding a wire rope and a driving motor for giving a rotating force to the drum are installed, a lifting body suspended from the wire rope and having a device coupling portion provided at a lower end thereof, and an upper contact point and a lower contact point respectively provided at the main body and the lifting body to make contact with each other when the lifting body ascends and is coupled to the main body by winding the wire rope, the control method comprising: (a) outputting a descending signal in a state where the main body and the lifting body are coupled; (b) determining whether the lifting body is normally released downward from the main body according to the descending signal; and (c) stopping the driving motor or executing the step (a) again when the lifting body is not normally released downward, wherein in the step (b), it is determined whether the lifting body is normally released downward from the main body by checking whether a weight of the lifting body is applied to the wire rope.

In the step (b), when a guide roll configured to support the wire rope is moved due to the weight of the lifting body to press a limit switch, it may be determined that the lifting body is normally released downward.

The control method of a lifting apparatus for a highly-mounted device according to the present disclosure may further comprise (d) outputting an ascending signal in a state where the lifting body is lowered; (e) determining whether the lifting body ascends and is normally coupled to the main body according to the ascending signal; and (f) stopping the driving motor or executing the step (d) again when the lifting body is not normally coupled to the main body.

The driving motor may be stopped when the lifting body is not normally released downward or the lifting body is not normally coupled to the main body even though the steps (c) and (f) are repeated by a predetermined number of times.

The control method of a lifting apparatus for a highly-mounted device according to the present disclosure may further comprise notifying a situation to a predetermined module through wireless communication after the driving motor is stopped.

The control method of a lifting apparatus for a highly-mounted device according to the present disclosure may further comprise operating the driving motor to give a rearward rotation so that the lifting body is caught by a stopper, after the lifting body is lifted and then stopped; and determining whether the lifting body is normally caught by the stopper by checking whether the weight of the lifting body applied to the wire rope is released.

It may be determined that the lifting body is normally caught by the stopper, when the guide roll supporting the wire rope returns and is separated from the limit switch due to the release of the weight of the lifting body.

The control method of a lifting apparatus for a highly-mounted device according to the present disclosure may further comprise automatically stopping the driving motor when the weight applied to the wire rope is released while the lifting body is normally operated to descend.

The control method of a lifting apparatus for a highly-mounted device according to the present disclosure may further comprise operating the driving motor to give a rearward rotation so that the lifting body stops for a predetermined time and ascends again, when an ascending stop switch signal is transmitted to a microcomputer before a slow switch signal is transmitted to the microcomputer while the lifting body is ascending.

A power supplied to a device coupled to the device coupling portion may be turned off before the driving motor operates according to the descending signal to separate the upper contact point and the lower contact point from each other, and the power supplied to the device coupled to the device coupling portion may be turned on after the lifting body ascends according to the ascending signal so that the upper contact point and the lower contact point make contact with each other.

Just before the lifting body reaches an ascending limit while ascending and being coupled to the main body, an elastic force may be applied to the lifting body so that the lifting body is stopped while changing an ascending speed.

The control method of a lifting apparatus for a highly-mounted device according to the present disclosure may further comprise determining an overload or overweight state of the lifting body by detecting the change of a rotating speed of the drum.

At least one selected from a light, a fire detector, a CCTV camera and a PR banner may be coupled to the device coupling portion.

In another aspect of the present disclosure, there is also provided a lifting apparatus for a highly-mounted device, comprising: a main body installed at a predetermined height so that a hollow drum for winding a wire rope and a driving motor for giving a rotating force to the drum are installed thereto; a lifting body suspended from the wire rope and having a device coupling portion provided at a lower end thereof; a coupling unit including a receiving structure located at a lower portion of the main body and having an open lower portion to be coupled with the lifting body, and a stopper installed at the receiving structure to give a fall prevention function for the lifting body; an upper contact point and a lower contact point respectively installed at the main body and the lifting body to make contact with each other when the lifting body ascends and is coupled to the main body by winding the wire rope; a plurality of guide rolls disposed at a side portion and an upper portion of the drum to support a wire rope unwound from the drum and guide the unwound wire rope into the hollow of the drum; a limit switch located at a lower portion of at least one of the plurality of guide rolls and disposed to selectively contact a portion of the guide roll; and a control unit configured to control an operation of the driving motor by recognizing whether a weight of the lifting body is applied to the wire rope and determining whether the lifting body and the stopper are coupled or separated. The control unit may determine that the lifting body is normally released downward by recognizing that the weight of the lifting body is applied to the wire rope so that the guide roll is moved to press the limit switch, and the control unit may determine that the lifting body is normally caught by the stopper by recognizing that the weight of the lifting body applied to the wire rope is released so that the guide roll returns to be separated from the limit switch.

Advantageous Effects

According to the present disclosure, it is possible to provide a lifting apparatus for a highly-mounted device, which has a structure capable of preventing a safety accident by lifting control in consideration of a coupling or separating error between a main body and a lifting body.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is a side view showing a state where a lifting body is completely lifted in

FIG. 1.

BEST MODE

Figure 1:
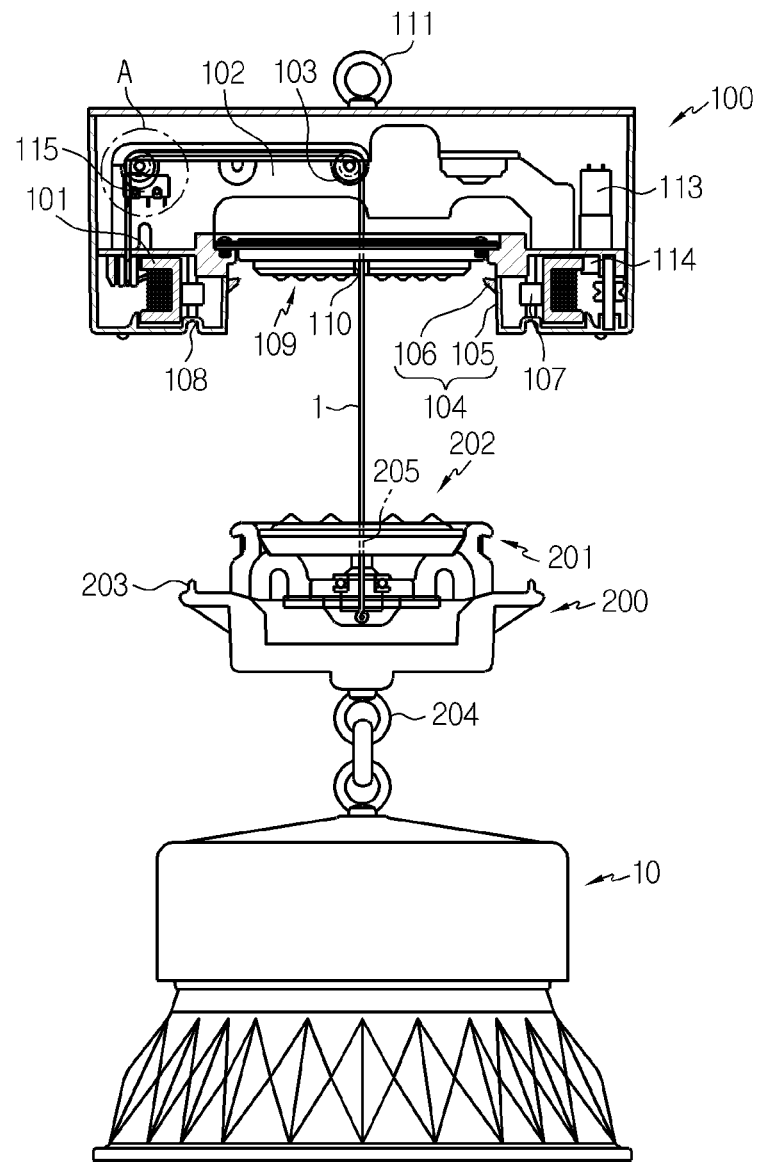
FIG. 1 is a side view showing a lifting apparatus for a highly-mounted device according to a preferred embodiment of the present disclosure.
Figure 2:
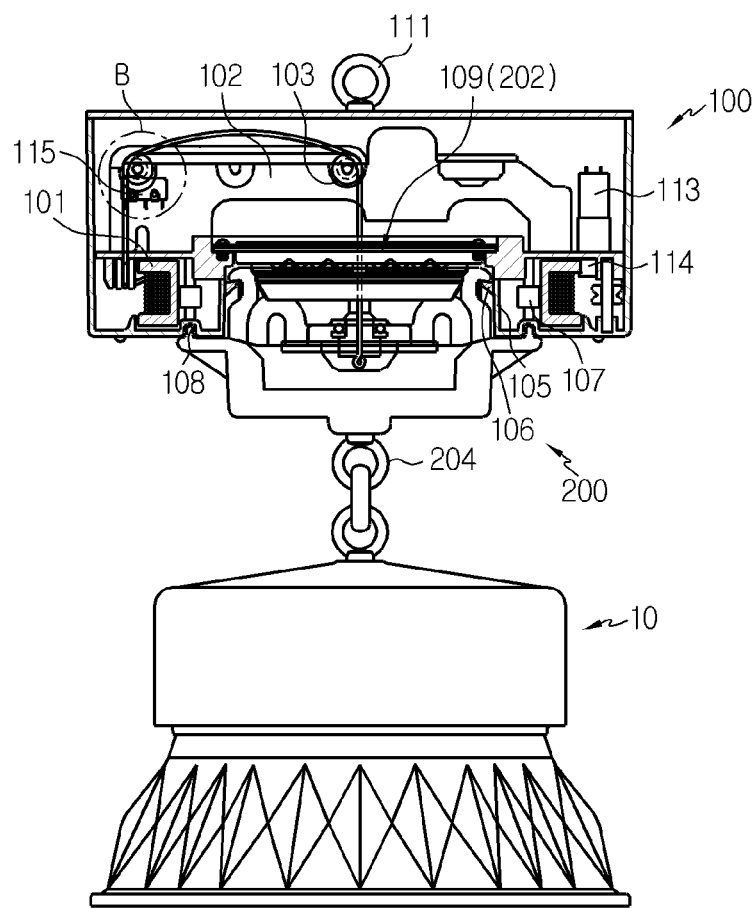

FIG. 1 is a side view showing a lifting apparatus for a highly-mounted device according to a preferred embodiment of the present disclosure, and FIG. 2 is a side view showing a state where a lifting body is completely lifted and coupled to a main body in FIG. 1.

Referring to FIGS. 1 and 2, a lifting apparatus for a highly-mounted device according to a preferred embodiment of the present disclosure includes a main body 100 installed at a predetermined height so that a drum 101 lying down is installed therein, a coupling unit 104 located at a lower portion of the main body 100, a lifting body 200 suspended from a wire rope 1 wound on the drum 101 and having a device coupling portion 204 formed at a lower end thereof so that a highly-mounted device is mounted thereto, an upper contact point 109 and a lower contact point 202 configured to make contact with each other when the lifting body 200 is lifted and coupled to the main body 100 by means of the coupling unit 104, a plurality of guide rolls 103 for supporting and guiding the wire rope 1, and a limit switch 115 disposed to a lower portion of at least one of the guide rolls 103.

The main body 100 is installed at a predetermined height at the top of a supporting structure such as the ceiling of a building or a streetlamp. For the installation of the main body 100, a mounting member 111, for example, made of a ring bolt is provided at the top of the main body 100. Alternatively, the main body 100 may be connected to a predetermined support bracket (not shown) that may be coupled to a predetermined H beam provided on the ceiling of the building.

Inside the main body 100, a drum 101 for winding the wire rope 1 therearound and a driving motor 113 for giving a rotating force in the forward or rearward direction to the drum 101 are included. A geared motor may be provided as the driving motor 113.

The drum 101 is a hollow cylindrical bobbin around which the wire rope 1 may be wound and unwound. The drum 101 is installed in the main body 100 so as to be rotatable in a state where its hollow is laid down to be substantially opened in the vertical direction with respect to the ground. Preferably, the drum 101 is arranged horizontally so that its diameter direction is perpendicular to the height direction of the main body 100. In a modified example of the present disclosure, the drum 101 may be arranged obliquely inclined such that one side of the drum 101 is slightly lifted from the horizontal state.

The rotating force provided from the driving motor 113 installed at one side of the main body 100 is transmitted to the drum 101 through a power transmission means having a gear assembly. Specifically, the drum 101 includes a ring gear (not shown) provided along the periphery of a body of the drum 101. The ring gear is engaged with a predetermined driving pinion 114, which is rotated by the driving motor 113, to receive a rotating force. The ring gear is fixed to the drum 101 or is integrally formed with the drum 101, so that the drum 101 rotates integrally with the ring gear. The power transmission means may employ a common technique. The technical configuration of transmitting a rotating force of the driving motor 113 to the horizontally arranged drum 101 using the gear assembly is disclosed in detail in Korean Patent Application No. 10-2013-0070072 filed by the applicant of this application.

In order to mediate the coupling between the main body 100 and the lifting body 200, the coupling unit 104 having a cylindrical receiving structure 105 is provided at a lower portion of the main body 100.

The coupling unit 104 is located at the lower portion of the main body 100 and allows the lifting body 200 to be coupled to the main body 100 at an accurate location when the lifting body 200 is lifted to a predetermined point by winding the wire rope 1. Specifically, the coupling unit 104 includes a receiving structure 105 having a predetermined shape and configured to guide the lifting body 200 to be aligned at the bottom center of the main body 100, and a stopper 106 for fixing the coupled state of the lifting body 200 to the main body 100.

The receiving structure 105 has a cylindrical shape having an open lower portion and having an inner space through which at least an upper portion of the lifting body 200 may move in and out. The receiving structure 105 may be integrally formed with the main body 100. Alternatively, the receiving structure 105 may be formed as a separate member from the main body 100 and detachably coupled to the lower portion of the main body 100.

The receiving structure 105 is located in the hollow of the drum 101 disposed inside the main body 100. That is, the drum 101 is disposed to substantially surround the receiving structure 105. According to this structure, the hollow of the drum 101 may be utilized as a space for the coupling between the main body 100 and the lifting body 200.

In the space between the receiving structure 105 and the drum 101, an anti-friction roll 107 in contact with an inner circumference of the drum 101 is rotatably installed to guide the rotation of the drum 101 in a horizontal state.

In order to increase the coupling accuracy between the main body 100 and the lifting body 200, a guide groove 108 is formed at a lower surface of the main body 100 to surround the receiving structure 105 in a circular form. The guide groove 108 is coupled with a guide protrusion 203 provided on the lifting body 200 when the lifting body 200 is inserted into the receiving structure 105, thereby guiding the main body 100 and the lifting body 200 to be coupled at an accurate location.

The stopper 106 is installed to protrude from an inner wall surface of the receiving structure 105 to fix the position of the lifting body 200 inserted into the receiving structure 105. A plurality of stoppers 106 are installed at equal intervals in the circumferential direction with respect to the center of the receiving structure 105.

The stopper 106 has a wedge-shaped body having an obliquely inclined lower surface and is installed to always maintain a horizontal state when an external force is not applied. The stopper 106 is installed to be pivotal around a shaft fastened to a part of the body so that the stopper 106 may be pushed and bent upward when the lifting body 200 ascends. A predetermined spring (not shown) is coupled to the stopper 106 to elastically bias the stopper 106 to return to the horizontal state. In the present disclosure, the stopper 106 may also be configured to protrude from the inner wall surface of the receiving structure 105 selectively by, for example, a driving means such as a solenoid.

The lifting body 200 is installed to be suspended from the wire rope 1, and the lifting body 200 is moved up and down along with the winding and unwinding operation of the wire rope 1. A device coupling portion 204 made of, for example, a ring bolt is provided to the lower portion of the lifting body 200. The device coupling portion 204 may have any shape or structure capable of supporting a highly-mounted device. For example, the device coupling portion 204 may have a screw structure capable of screw coupling with the highly-mounted device.

Figure 3:
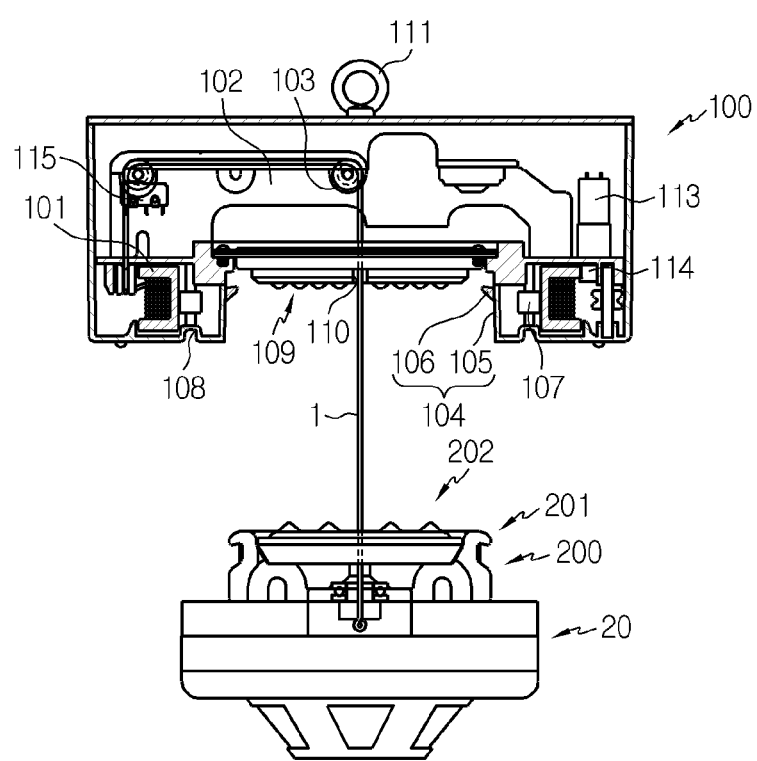
FIG. 3 is a side view showing a modified example where a fire detector is coupled to the lifting body of FIG. 1.
Figure 4:
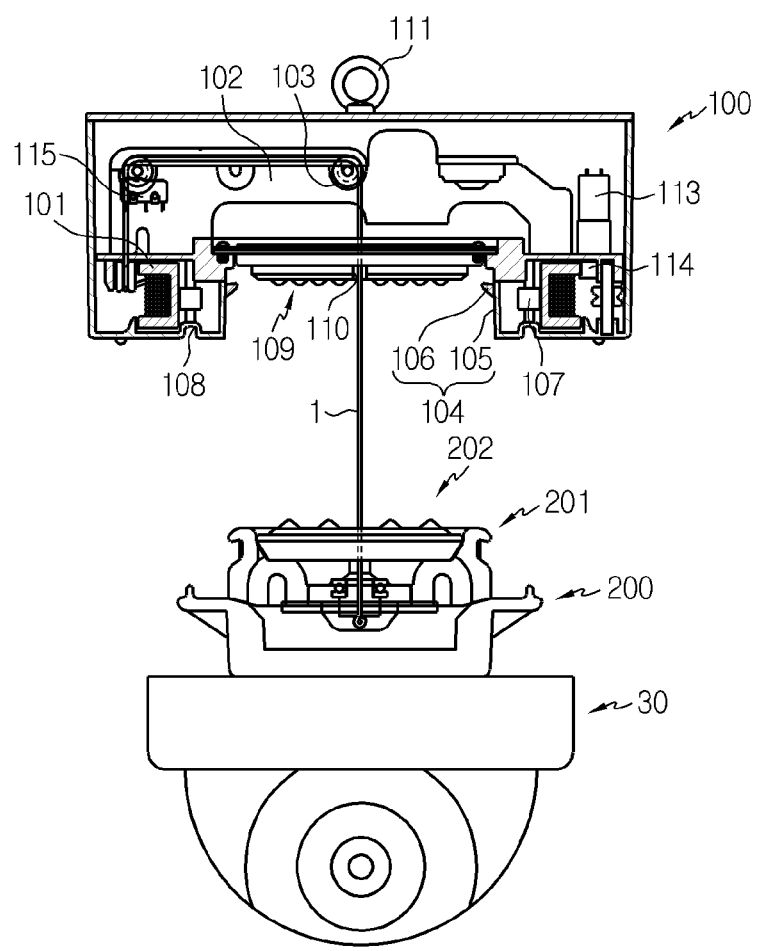
FIG. 4 is a side view showing a modified example where a CCTV camera is coupled to the lifting body of FIG. 1.

A light 10 serving as a highly-mounted device is coupled to the device coupling portion 204. As another example, as shown in FIG. 3, a fire detector 20 may be coupled to the device coupling portion 204 as a highly-mounted device. As still another example, as shown in FIG. 4, a CCTV camera 30 may be coupled to the device coupling portion 204 as a highly-mounted device.

A suspending protrusion 201 corresponding to the stopper 106 is formed at an upper end of the outer circumference of the lifting body 200. The suspending protrusion 201 pushes the stopper 106 upward to be pivoted when the lifting body 200 ascends, and also a groove portion of the suspending protrusion 201 is coupled with the stopper 106 to fix the position of the lifting body 200.

The wire rope 1 unwound from the drum 101 extends down through the hollow of the drum 101 and is connected to the lifting body 200. To this end, the plurality of guide rolls 103 are disposed at a side portion and an upper portion of the drum 101 to guide the wire rope 1 unwound from the drum 101 into the hollow of the drum 101. Among the plurality of guide rolls 103, a guide roll 103 located at the upper portion of the drum 101 is mounted to a guide frame 102 that is disposed in the main body 100 to cross the upper portion of the drum 101.

If the wire rope 1 is arranged in a one-rope type, namely if the wire rope 1 passing through the hollow of the drum 101 has one rope, at least one guide roll 103 among the plurality of guide rolls 103 is located at a point where the guide roll 103 may guide the wire rope 1 to the hollow center of the drum 101.

Figure 5:
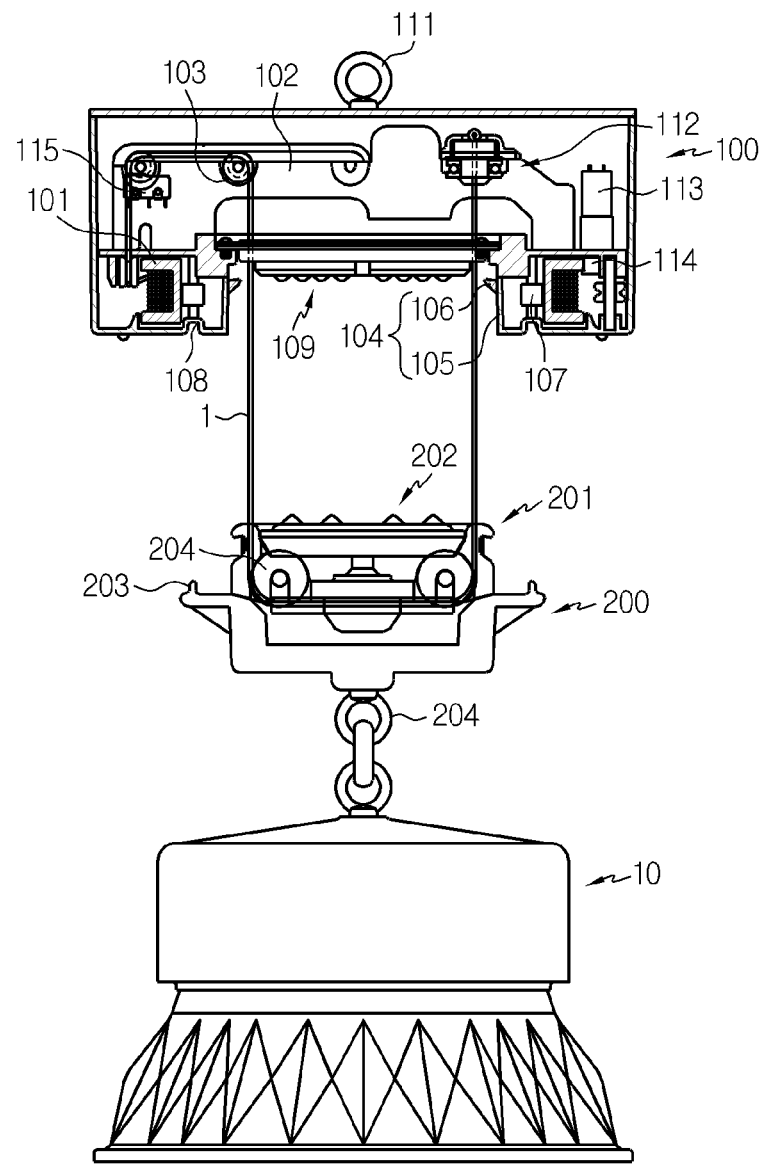
FIG. 5 is a side view showing a two-rope type lifting apparatus for a highly-mounted device according to another embodiment of the present disclosure.

Meanwhile, if the wire rope 1 has an arrangement of a two-rope type, namely if the wire rope 1 passing through the hollow of the drum 101 has two ropes, as shown in FIG. 5, two ropes of the wire rope 1 pass through both sides of the hollow of the drum 101 spaced apart from each other by a predetermined distance from the center of the hollow of the drum 101. To this end, a fixing unit 112 is mounted to the guide frame 102 to support an end of the wire rope 1, and the wire rope 1 is arranged so that the end is fixed to the fixing unit 112 via the guide roll 103 and the lifting body 200. Accordingly, the wire rope 1 extends in a vertical zigzag shape, and two ropes of the wire rope 1 pass through the hollow of the drum 101. In this case, at least one guide roll 204 is preferably mounted to the lifting body 200 to enable the smooth movement of the lifting body 200 with respect to the wire rope 1. In addition, the fixing unit 112 preferably includes a thrust bearing to prevent twisting of the wire rope 1.

The limit switch 115 is installed to the guide frame 102 to be disposed under at least one guide roll 103. The limit switch 115 is arranged such that a button 115a thereof is in a selective contact with a rotary shaft 103a of the guide roll 103 corresponding thereto. The limit switch 115 outputs an on/off signal to a control unit 300 in accordance with the state of the guide roll 103. The control unit 300 determines whether the weight of the lifting body 200 is applied to or released from the wire rope 1 and controls the driving motor 113 based on the determination.

Figure 8:
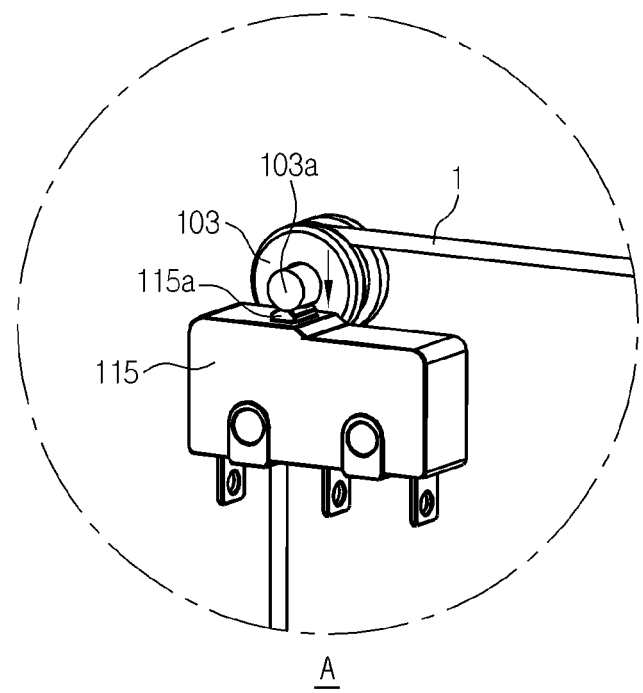
FIG. 8 is a perspective view showing a portion "A" of FIG. 1 in detail.
Figure 9:
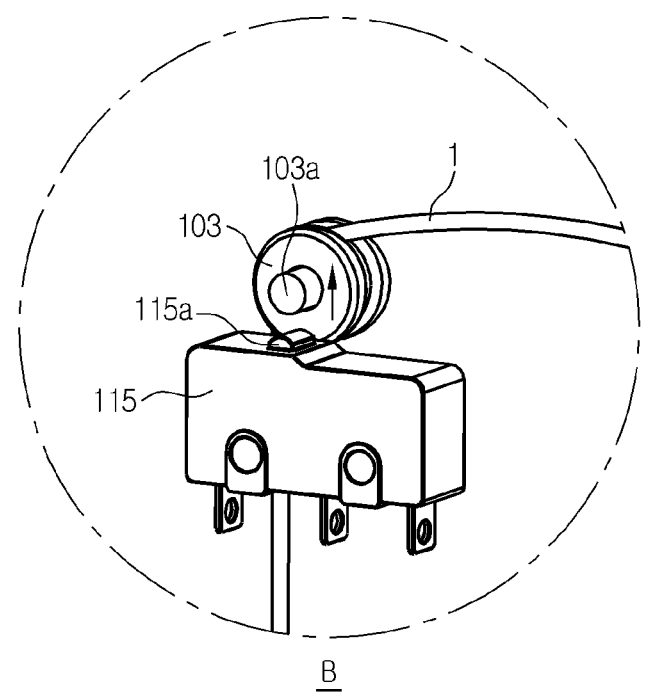
FIG. 9 is a perspective view showing a portion "B" of FIG. 1 in detail.

As shown in FIG. 8, the limit switch 115 is turned on when the guide roll 103 descends so that the rotary shaft 103a presses the button 115a of the limit switch 115. Also, as shown in FIG. 9, the limit switch 115 is turned off when the guide roll 103 ascends and returns so that the rotary shaft 103a is separated from the button 115a of the limit switch 115.

The control unit 300 executes a process of outputting a descending signal in a state where the main body 100 and the lifting body 200 are coupled, a process of determining whether the lifting body 200 is normally released downward from the main body 100 according to the descending signal, and a process of stopping the driving motor 113 or executing the previous steps again if the lifting body 200 is not normally released downward. In addition, the control unit 300 executes a process of outputting an ascending signal in a state where the lifting body 200 is lowered, a process of determining whether the lifting body 200 ascends and is normally coupled with the main body 100 according to the ascending signal, and a process of stopping the driving motor 113 or executing the previous steps again if the lifting body 200 is not normally coupled with main body 100. The control unit 300 stops the driving motor 113 if the lifting body 200 is not normally released downward or the lifting body 200 is not normally coupled with the main body 100 even though the previous steps are repeated up to a predetermined number of times. Here, the 'downward release' of the lifting body 200 refers to a state where the stopper 106 is normally released from the lifting body 200 and the lifting body 200 is separated from the lower portion of the main body 100 by means of the descending of the wire rope 1.

Figure 10:
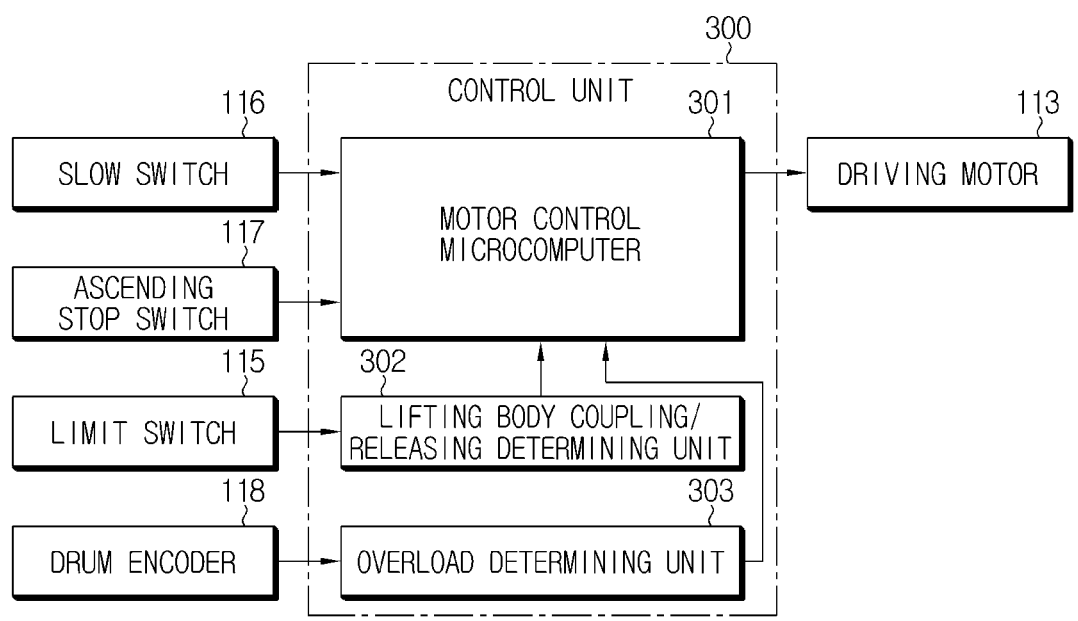
FIG. 10 is a block diagram showing a functional configuration for controlling the lifting apparatus for a highly-mounted device according to a preferred embodiment of the present disclosure.

As shown in FIG. 10, the control unit 300 includes a motor control microcomputer 301 for controlling the operation of the driving motor 113 that drives the drum 101, a lifting body coupling/releasing determining unit 302 for determining whether the stopper 106 and the lifting body 200 are coupled or released, and an overload determining unit 303 for determining whether the drum 101 is overloaded.

The motor control microcomputer 301 controls the rotating speed and the rotating direction (forward direction/rearward direction) of the driving motor 113 as well as on/off operation of the driving motor 113.

When the guide roll 103 moves downward and the limit switch 115 is turned on, the lifting body coupling/releasing determining unit 302 receives a turn-on signal from the limit switch 115 to recognize that the weight of the lifting body 200 is applied to the wire rope 1. If the wire rope 1 is tightened since the weight of the lifting body 200 is applied thereto, the lifting body coupling/releasing determining unit 302 determines that the lifting body 200 is released from the stopper 106. Meanwhile, when the guide roll 103 returns to its original position and the limit switch 115 is turned off, the lifting body coupling/releasing determining unit 302 receives a turn-off signal from the limit switch 115 and recognized that the weight of the lifting body 200 is applied to the wire rope 1 is released. If the weight of the lifting body 200 is released from the wire rope 1 so that the wire rope 1 is loose, the lifting body coupling/releasing determining unit 302 determines that the lifting body 200 is coupled to and supported by the stopper 106.

The overload determining unit 303 detects the rotating speed of the drum 101 to determine an overload or overweight state of the lifting body 200. That is, the overload determining unit 303 receives a signal from an drum encoder 118 installed at one side of the drum 101 and detects the change in the rotating speed of the drum 101 to determine whether the drum 101 is in an overload or overweight state. For example, the overload determining unit 303 is set to receive one signal per second from the drum encoder 118 in a normal state, and for example, recognizes that the rotating speed of the drum 101 is reduced if one signal is input for three seconds, and then determines that this is an overload or overweight state. When it is recognized that the rotating speed of the drum 101 is abnormal, the overload determining unit 303 transmits a signal to the motor control microcomputer 301 to control appropriately, for example by stopping the driving motor 113.

Preferably, if the lifting body 200 is not normally released downward or if the lifting body 200 is not normally coupled with the main body 100, the control unit 300 stops the driving motor 113 through the motor control microcomputer 301. In addition, after the driving motor 113 is stopped, an operation of notifying this situation to a given receiving module by predetermined wireless communication is performed.

If the weight of the lifting body 200 applied to the wire rope 1 is released when the lifting body 200 is operates normally to descend, the control unit 300 automatically stops the driving motor 113 through the motor control microcomputer 301.

In addition, if a signal is input from the ascending stop switch 117 to the motor control microcomputer 301 before a signal is input from a slow switch 116 to the motor control microcomputer 301 while the lifting body 200 is ascending, the control unit 300 controls the driving motor 113 to give a reverse rotation so that the lifting body 200 stops for a predetermined time and then ascends again.

In order to protect a highly-mounted device from electrical shock, the control unit 300 controls to turn off in advance the power supplied to the highly-mounted device connected to the device coupling portion 204 before the driving motor 113 operates according to the descending signal to separate the upper contact point 109 and the lower contact point 202 from each other. In addition, after the lifting body 200 ascends according to the ascending signal so that the upper contact point 109 and the lower contact point 202 contact each other, the control unit 300 controls to turn on the power supplied to the highly-mounted device coupled to the device coupling portion 204.

When the lifting body 200 is coupled to the main body 100 ascending, an elastic force is preferably applied from a predetermined elastic member (not shown) just before the lifting body 200 reaches an ascending limit, so that the ascending speed of the lifting body 200 is gradually reduced.

Figure 6:
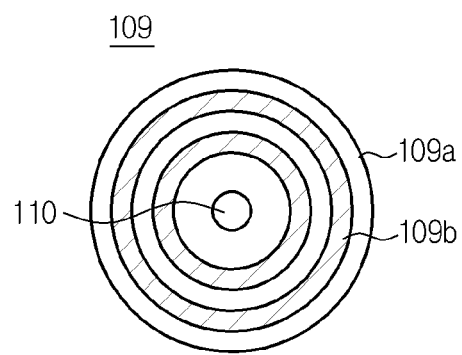
FIG. 6 is a plane view showing an upper contact point of FIG. 1.

The upper contact point 109 and the lower contact point 202 are provided at the lower portion of the main body 100 and the upper portion of the lifting body 200, respectively, to contact and electrically connect each other when the main body 100 and the lifting body 200 are coupled. Specifically, the upper contact point 109 is fixed to the upper portion of the receiving structure 105 of the coupling unit 104 disposed at the inner region of the drum 101. As shown in FIG. 6, the upper contact point 109 has a plurality of ring-shaped conductor patterns 109b arranged concentrically on the base member 109a of a disc shape. Thus, the contact state may be maintained even though the lifting body 200 is relatively rotated with respect to the main body 100 by a predetermined angle while the lifting body 200 is ascending. A perforation hole 110 is formed in the upper contact point 109 so that the wire rope 1 passes therethrough.

The lower contact point 202 is fixed to the upper end of the lifting body 200 and is inserted into the receiving structure 105 of the coupling unit 104 to make contact with the upper contact point 109 when the main body 100 and the lifting body 200 are coupled. In other words, the upper contact point 109 and the lower contact point 202 are substantially in contact with each other in the hollow inner region of the drum 101.

Figure 7:
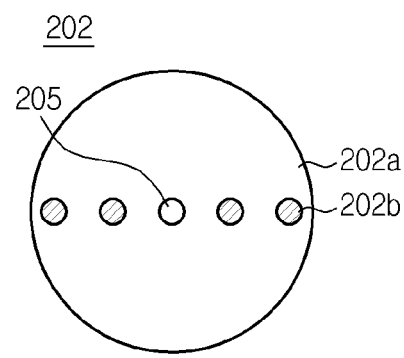
FIG. 7 is a plane view showing a lower contact point of FIG. 1.

As shown in FIG. 7, the lower contact point 202 has a plurality of dot-shaped conductor patterns 202b formed in the radial direction on the disk-shaped base member 202a to correspond to the concentric contact conductor patterns 109b. A perforation hole 205 is also formed in the lower contact point 202 so that the wire rope 1 passes therethrough.

As an alternative, it is also possible that the upper contact point 109 has a dot-shaped conductor pattern and the lower contact point 202 has a ring-shaped conductor pattern. As another alternative, the upper contact point 109 and the lower contact point 202 may have a ring-shaped conductor pattern and a dot-shaped conductor pattern in combination, respectively.

In the lifting apparatus for a highly-mounted device configured as above according to a preferred embodiment of the present disclosure, when the lifting body 200 ascends and is coupled with the main body 100 by winding the wire rope 1, the upper contact point 109 and the lower contact point 202 make contact with each other so that power is supplied to the highly-mounted device 10, 20, 30 mounted to the lifting body 200.

The operation of winding the wire rope 1 is performed by the drum 101 that is arranged horizontally in the main body 100 and rotates in a forward direction by the driving motor 113. At this time, the wire rope 1 is pulled up while passing through the hollow of the drum 101, and then changes its moving direction by the guide roll 103 and is wound around the drum 101.

When the lifting body 200 ascends and reaches a predetermined point by winding the wire rope 1, the arrival state is detected by a predetermined limit switch (not shown), and the rotation of the drum 101 is stopped according to the detection signal. In addition, the suspending protrusion 201 provided at the top of the outer peripheral surface of the lifting body 200 is caught by the stopper 106 protruding from the inner wall of the receiving structure 105 of the coupling unit 104, thereby fixing the lifting body 200 to the main body 100.

When the lifting body 200 is inserted into and fixed to the receiving structure 105, the upper contact point 109 and the lower contact point 202 contact and are electrically connected to each other. Here, since the receiving structure 105 is located in the inner space of the drum 101 arranged horizontally, the contact between the upper contact point 109 and the lower contact point 202 is substantially made in the hollow of the drum 101. In this way, since the main body 100 and the lifting body 200 are coupled and the upper contact point 109 and the lower contact point 202 make contact with each other by utilizing the hollow of the drum 101, it is possible to significantly increase the space utilization. In addition, since the contact between the upper contact point 109 and the lower contact point 202 is made in a state where the main body 100 and the lifting body 200 are mechanically correctly coupled, it is possible to prevent contact failure.

When cleaning or replacing the highly-mounted device 10, 20, 30, the stopping state of the stopper 106 to the lifting body 200 is released, and then the drum 101 is rotated in the rearward direction to release the wire rope 1 through the hollow of the drum 101 so that the lifting body 200 is lowered to the ground. In order to release the stopping state of the stopper 106, the drum 101 may be driven to lift the lifting body 200 upward a little by rotating in a forward direction slightly. By this process, the stopper 106 deviates from the side of the lifting body 200 and returns to its original position, and accordingly the lifting body 200 may come into a state capable of freely descending.

When the lifting body 200 descends, it is accurately determined whether the weight of the lifting body 100 is applied to the wire rope 1 by using the limit switch 115 that is associated with the guide roll 103. If the weight of the lifting body 100 is applied to the wire rope 1 so that the wire rope 1 is pulled tight, the guide roll 103 moves down, and the rotary shaft 103*a* presses the button 115*a* of the limit switch 115 to turn on the limit switch 115. If the weight of the lifting body 100 is applied to the wire rope 1 so that the wire rope 1 is pulled tight, the control unit 300 determines that this is a normal state, and controls the driving motor 113 to lower the lifting body 200.

Meanwhile, if the weight of the lifting body 100 is not applied to the wire rope 1 so that the wire rope 1 is loosened, the guide roll 103 ascends and returns, and the rotary shaft 103*a* is separated from the button 115*a* of the limit switch 115 to turn off the limit switch 115. If the weight of the lifting body 100 is not applied to the wire rope 1 so that the wire rope 1 is loosened, the control unit 300 determines that the lifting body 200 is caught by the stopper 106 and thus is not normally released downward, and stops the driving motor 113.

As described above, in the present disclosure, it is possible to determine whether the lifting body 200 is normally released downward by checking whether the weight of the lifting body 200 is applied to the wire rope 1.

INDUSTRIAL APPLICABILITY

If the present disclosure is applied, it is possible to improve the stability of the lifting apparatus for a highly-mounted device by lifting control in consideration of a coupling or separating error between the main body and the lifting body.

What is claimed is:

1. A control method of a lifting apparatus for a highly-mounted device, the lifting apparatus including a main body at which a hollow drum for winding a wire rope and a driving motor for giving a rotating force to the drum are installed, a lifting body suspended from the wire rope and having a device coupling portion provided at a lower end thereof, and an upper contact point and a lower contact point respectively provided at the main body and the lifting body to make contact with each other when the lifting body ascends and is coupled to the main body by winding the wire rope, the control method comprising:
    (a) outputting a descending signal in a state where the main body and the lifting body are coupled;
    (b) determining whether the lifting body is normally released downward from the main body according to the descending signal; and
    (c) stopping the driving motor or executing the step (a) again when the lifting body is not normally released downward,
    wherein in the step (b), it is determined whether the lifting body is normally released downward from the main body by checking whether a weight of the lifting body is applied to the wire rope; wherein in the step (b), when a guide roll configured to support the wire rope is moved due to the weight of the lifting body to press a limit switch, it is determined that the lifting body is normally released downward.

2. The control method of a lifting apparatus for a highly-mounted device according to claim 1, further comprising:
    (d) outputting an ascending signal in a state where the lifting body is lowered;
    (e) determining whether the lifting body ascends and is normally coupled to the main body according to the ascending signal; and
    (f) stopping the driving motor or executing the step (d) again when the lifting body is not normally coupled to the main body.

3. The control method of a lifting apparatus for a highly-mounted device according to claim 2,
    wherein the driving motor is stopped when the lifting body is not normally released downward or the lifting body is not normally coupled to the main body even though the steps (c) and (f) are repeated by a predetermined number of times.

4. The control method of a lifting apparatus for a highly-mounted device according to claim 3, further comprising:
    notifying a situation to a predetermined module through wireless communication after the driving motor is stopped.

5. The control method of a lifting apparatus for a highly-mounted device according to claim 2, further comprising:
    operating the driving motor to give a rearward rotation so that the lifting body is caught by a stopper, after the lifting body is lifted and then stopped; and
    determining whether the lifting body is normally caught by the stopper by checking whether the weight of the lifting body applied to the wire rope is released.

6. The control method of a lifting apparatus for a highly-mounted device according to claim 5,
    wherein it is determined that the lifting body is normally caught by the stopper, when the guide roll supporting the wire rope returns and is separated from the limit switch due to the release of the weight of the lifting body.

7. The control method of a lifting apparatus for a highly-mounted device according to claim 6, further comprising:
    automatically stopping the driving motor when the weight applied to the wire rope is released while the lifting body is normally operated to descend.

8. The control method of a lifting apparatus for a highly-mounted device according to claim 7, further comprising:
    operating the driving motor to give a rearward rotation so that the lifting body stops for a predetermined time and ascends again, when an ascending stop switch signal is transmitted to a microcomputer before a slow switch signal is transmitted to the microcomputer while the lifting body is ascending.

9. The control method of a lifting apparatus for a highly-mounted device according to claim 2,
    wherein a power supplied to a device coupled to the device coupling portion is turned off before the driving motor operates according to the descending signal to separate the upper contact point and the lower contact point from each other, and
    wherein the power supplied to the device coupled to the device coupling portion is turned on after the lifting body ascends according to the ascending signal so that the upper contact point and the lower contact point make contact with each other.

10. The control method of a lifting apparatus for a highly-mounted device according to claim 2,
    wherein just before the lifting body reaches an ascending limit while ascending and being coupled to the main body, an elastic force is applied to the lifting body so that the lifting body is stopped while changing an ascending speed.

11. The control method of a lifting apparatus for a highly-mounted device according to claim 1, further comprising:
   determining an overload or overweight state of the lifting body by detecting the change of a rotating speed of the drum.

12. The control method of a lifting apparatus for a highly-mounted device according to claim 1,
   wherein at least one selected from a light, a fire detector, a CCTV camera and a PR banner is coupled to the device coupling portion.

13. A lifting apparatus for a highly-mounted device, comprising:
   a main body installed at a predetermined height so that a hollow drum for winding a wire rope and a driving motor for giving a rotating force to the drum are installed thereto;
   a lifting body suspended from the wire rope and having a device coupling portion provided at a lower end thereof;
   a coupling unit including a receiving structure located at a lower portion of the main body and having an open lower portion to be coupled with the lifting body, and a stopper installed at the receiving structure to give a fall prevention function for the lifting body;
   an upper contact point and a lower contact point respectively installed at the main body and the lifting body to make contact with each other when the lifting body ascends and is coupled to the main body by winding the wire rope;
   a plurality of guide rolls disposed at a side portion and an upper portion of the drum to support a wire rope unwound from the drum and guide the unwound wire rope into the hollow of the drum;
   a limit switch located at a lower portion of at least one of the plurality of guide rolls and disposed to selectively contact a portion of the guide roll; and
   a control unit configured to control an operation of the driving motor by recognizing whether a weight of the lifting body is applied to the wire rope and determining whether the lifting body and the stopper are coupled or separated; wherein the control unit determines that the lifting body is normally released downward by recognizing that the weight of the lifting body is applied to the wire rope so that the guide roll is moved to press the limit switch, and the control unit determines that the lifting body is normally caught by the stopper by recognizing that the weight of the lifting body applied to the wire rope is released so that the guide roll returns to be separated from the limit switch.

* * * * *